United States Patent [19]
Seborg et al.

[11] 3,827,683
[45] Aug. 6, 1974

[54] CLAMPING FRAME FOR PLASTIC SHEET MATERIAL

[75] Inventors: Earnest Y. Seborg, Rockford; Harold R. Wanke, Cherry Valley, both of Ill.

[73] Assignee: Greenlee Bros. & Co., Rockford, Ill.

[22] Filed: Mar. 6, 1972

[21] Appl. No.: 232,137

[52] U.S. Cl............ 269/9, 26/54, 269/43, 269/56, 269/153, 269/296, 425/397
[51] Int. Cl........... B29c 17/02, D06c 3/08
[58] Field of Search........ 26/54 R, 54 A, 6 A, 61 B, 26/62 A, 62 B, 57 R; 38/102.5, 102.4, 102.91; 269/55, 56, 94, 111, 287, 9; 425/111, 167, 383, 394, 445, 397, 455

[56] References Cited
UNITED STATES PATENTS

| | | | |
|---|---|---|---|
| 2,011,001 | 8/1935 | Lane | 26/62 B |
| 2,759,217 | 8/1956 | Peterson | 26/54 X |
| 3,025,566 | 3/1962 | Kostur | 425/167 |
| 3,055,048 | 9/1962 | Koppehele | 26/57 R X |
| 3,287,765 | 11/1966 | Puente | 38/102.91 X |
| 3,466,706 | 9/1969 | Asano | 269/94 |

Primary Examiner—Roy Lake
Assistant Examiner—Neil Abrams
Attorney, Agent, or Firm—Malcolm R. McKinnon

[57] ABSTRACT

This disclosure relates to a frame for clamping a single sheet of plastic material or a pair of sheets of plastic material in parallel, closely spaced relation to each other during the routing of the plastic material through various stations during operations in which the sheet or sheets are formed into plastic products.

23 Claims, 16 Drawing Figures

CLAMPING FRAME FOR PLASTIC SHEET MATERIAL

BRIEF SUMMARY OF THE INVENTION

This invention relates to thermoforming of products from sheets of plastic material and particularly to a clamping frame for holding the sheets of plastic material during their heating to a molding temperature and during the actual molding thereof.

Prior art devices used in thermoforming have usually been of a fixed dimension so that different sizes of plastic sheet material can be accommodated only by having suitable sized frames for each size of plastic material or by modifying the frames by actual reconstruction. Moreover, prior art frames for supporting plastic sheet material have usually incorporated clamping means which include actuators operated by either air or hydraulic circuits and such actuators have usually been mounted directly on the clamping frame. As a result of this, it has been necessary to transport the clamping frame and actuators into the heating zone where the temperatures to which the plastic material must be subjected to bring it to a moldable or thermoforming temperature have had a detrimental effect on the actuators.

The fixed supporting frames for sheets of plastic material in the prior art are subject to alternate heating and cooling during the various steps of the thermoforming process and, as a result, the frames tend to warp and distort slightly. Such distortion makes it difficult to support the plastic sheet uniformly around its periphery and, as a result, support usually is attained in only localized positions so that the plastic sheets of material distort unpredictably and have a detrimental effect on the finished, molded product.

In the thermoforming art, it is not uncommon to support two sheets of plastic material in parallel spaced relation to each other to make hollow products by vacuum forming techniques or by blow molding techniques. In this case, the fixed frames of the prior art present many problems relative to loading of the plastic sheets. For example, it is usually necessary to load one sheet of plastic material from one side of the frame and the other sheet of plastic material from the other side of the frame. Moreover, after the sheets of plastic material have been molded to their desired form, the waste material around the perimeter of the product remains attached to the product and the frame interferes with removal of the product from the frame. It then becomes necessary to sever the waste, or flash, material from the molded product before the product can be removed from the frame or, in the alternative, it is necessary to distort or flex the flash material so that it clears the fixed frame. This has a detrimental effect on the finished product since it often imposes undesirable loads on the partially cured product which results in defects in the product itself or makes it necessary to use a larger plastic sheet to overcome the problem.

By contrast, it is an object of the present invention to provide a thermoforming clamping frame which is adjustable to accommodate various sizes of plastic sheet material.

It is another object of the invention to provide a thermoforming clamping frame for sheets of plastic material in which the actuators by which the clamping means and support means are actuated to grip the plastic sheet material are supported separately of the clamping frame and can remain stationary, permitting the routing of the frame to a heating zone leaving the actuators behind.

It is still another object of the invention to provide a thermoforming clamping frame in which the periphery of the plastic sheet material may be held at generally uniform spaced points around the entire periphery of the sheet and one in which the points at which the sheet is held may be adjusted to uniformly grip the plastic sheet material even though the frame may become distorted during alternate heating and cooling thereof.

Still another object of the invention is to provide a clamping frame for use during thermoforming in which one or more sheets of plastic material may be loaded from either side of a frame and in which the molded product may likewise be removed from either side of the frame.

Another object of the invention is to provide a clamping frame for thermoforming of plastic sheet material in which the molded product together with its peripheral waste material, or flash, may be removed from either side of the clamping frame without any interference from the frame.

Another object of the invention is to provide a thermoforming clamping frame utilizing materials and like parts to afford a clamping frame that is economical and commercially feasible to manufacture and which is durable, efficient and reliable in operation.

These and other objects, advantages and features of the present invention will become more apparent from the following description, the appended claims and from the accompanying drawings.

BRIEF DESCRIPTION OF THE DRAWINGS

FIG. 8 is a view at an enlarged scale of one of the parts taken on line 8—8 in FIG. 2;

FIG. 9 is a view also at an enlarged scale of one of the parts taken on line 9—9 in FIG. 2;

DETAILED DESCRIPTION

Figure 1:
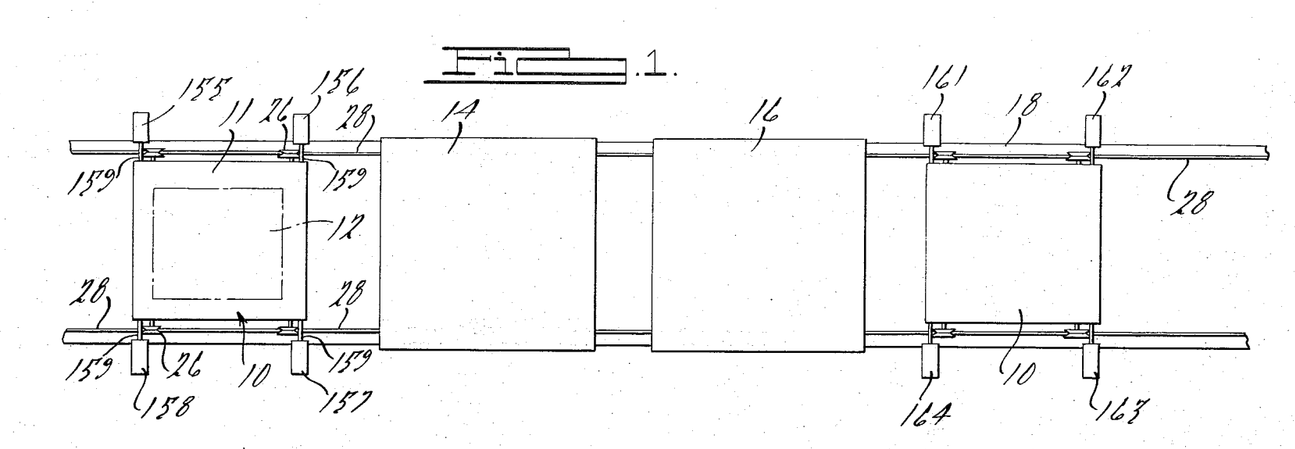
FIG. 1 is a schematic plan view of thermoforming equipment showing the various operating stations with which the clamping frame embodying the present invention is utilized.

Referring to the drawings and particularly to FIG. 1, the clamping frame assembly 10 embodying the present invention is shown employed with equipment by which the clamping frame is disposed in a loading station 11 and is loaded with plastic sheets 12 and 13 (only one of which is shown) secured to the frame 10 in parallel spaced relation to each other. The frame 10 together with the plastic sheets 12 and 13 is moved to a heating zone 14. In the heating zone, thermal elements of a suitable character may be disposed both above and below the plastic sheet material and may be used to heat the material to forming temperatures in a manner well known in the art. After heating to a desired temperature, the clamping frames 10 together with the plastic material is moved to a molding zone 16 wherein the plastic sheets may be formed by utilization of dies as is well known in the vacuum forming or blow molding arts. After the plastic sheet material is formed to the desired shape and allowed to cool or cure, the clamping frame 10 is moved to an unloading zone 18 at which point the molded plastic form is removed and the frame assembly 10 is made available for utilization at the loading zone 11.

The clamping frame assembly 10 and the apparatus with which it is used, as shown schematically in FIG. 1, is illustrative only and it should be understood that the clamping frame assembly 10 embodying the present invention may be disposed in other than the horizontal position, for example, in a vertical position, and that it need not be transported from station to station in purely straight line direction but that it may be employed in a generally circular or rectilinear arrangement wherein the unloading station 18 and loading stations 11 are adjacent to each other. In the description of the preferred embodiment of the invention, the frame 10 will be considered as being disposed generally horizontally for horizontal movement from station to station.

Figure 2:
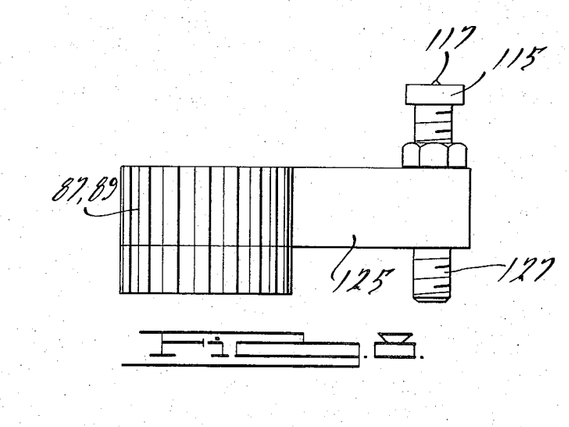
FIG. 2 is a top plan view of a thermoforming clamping frame with portions thereof broken away for the purposes of disclosure.

Referring to FIG. 2, the thermoforming clamp frame 10 embodying the present invention includes a rigid supporting frame 20 which may be made of channel stock and includes side members 22 and end members 24 rigidly connected together in any conventional manner, for example, by welding. The rigid frame 20 is supported for movement from station to station by means of wheels 26 adapted to engage conveyor track 28 by which the entire frame assembly 10 may be moved from one station to another as described previously in connection with FIG. 1.

The rigid supporting frame 20 supports and positions an adjustable plastic sheet receiving framework 30 which includes a pair of parallel spaced side frame assemblies 32 and a pair of parallel spaced end frame assemblies 34. The side frame assemblies 32 are adjustable to and from each other and the end frame assemblies 34 are adjustable to and from each other in a manner to be more fully described hereafter. The adjustable framework 30 formed by the side and end frame assemblies 32 and 34 is adapted to hold a pair of sheets of plastic material 12 and 13, only the edge portions of which are shown in FIGS. 3 and 4, in parallel spaced apart relationship.

Figure 3:
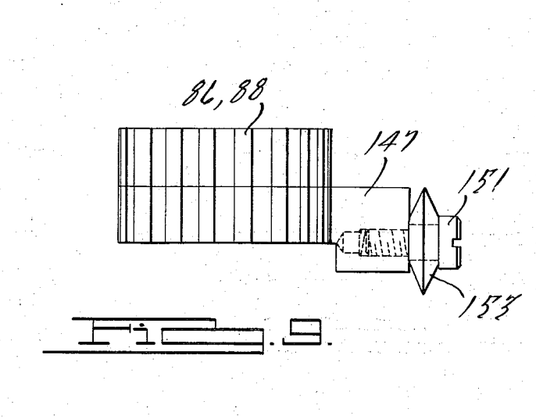
FIG. 3 is a cross sectional view of a thermoforming clamping frame taken on line 3—3 in FIG. 2.
Figure 4:
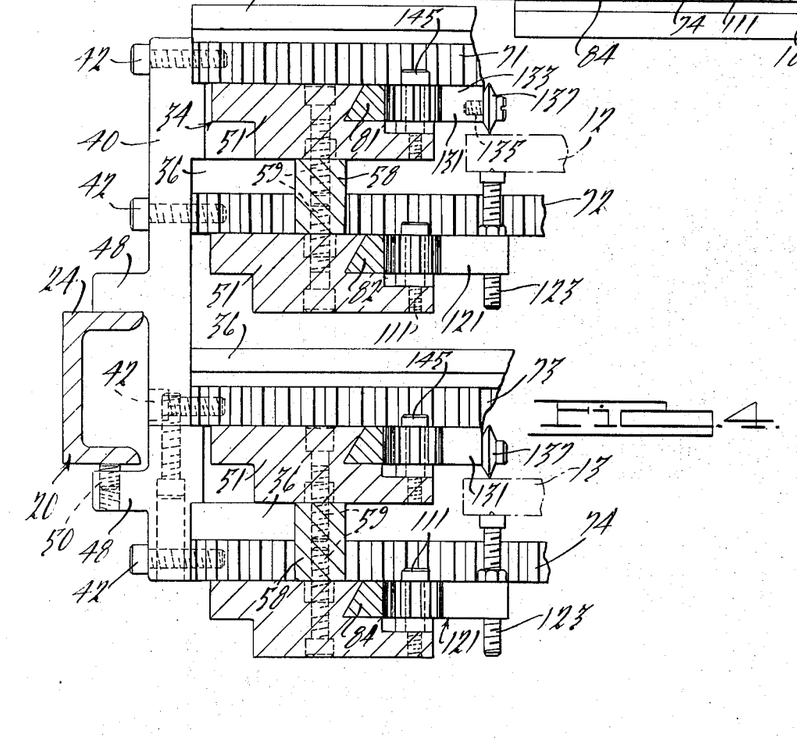
FIG. 4 is a sectional view of the clamping frame taken on line 4—4 in FIG. 2.

Referring to FIGS. 3 and 4, each side frame assembly 32 includes four identical, elongated rail members 36 each having a generally Z-shaped cross section. The four side rails 36 are held in spaced apart relationship by bracket components 40 which are fastened to the ends of the side rails 36 by means of bolts 42 as best seen in FIG. 4. The spacing between the side rails 36 is maintained at a uniform distance by means of a pair of spacer bars 44, as best seen in FIGS. 2 and 3, which are disposed intermediate the ends of rails 36, one bar 44 being positioned between the top two rails 36 and the other bar 44 between the two bottom side rails 36. The spacer bars 44 are fixed to the rails 36 by means of bolts 46.

Each of the bracket components 40 is provided with a pair of spaced flanges 48 which are adapted to be disposed above and below, respectively, the top and bottom surfaces of the channel shaped end members 24. Each of the bottom flanges is provided with a set screw 50 which is threaded into the flange and may be tightened to engage the fixed end members 24 to hold the bracket component 40 in fixed relation thereto.

The end frame assemblies 34 each include four identical end rails 51 having a Z-shaped cross section as seen in FIG. 4. It will be noted that the cross sections of the end rails 51 and of the side rails 36 are identical except that the end rails 51 have been inverted from the position of the side rails 36. The identical cross section of the end and side rails 36 and 51 is significant since the configuration is such that the material for the rails may be extruded and the same configuration used for both the ends and the side rail assemblies 32 and 34 thereby saving a large amount of machining and affording a more economical construction.

The end rails 51 are held in spaced apart relationship relative to each other by bracket components 56 shown in FIG. 3 disposed at opposite ends of the end rail members and secured thereto by means of bolts 57. A spacer 58 is disposed intermediate the ends and between the two top rails 51 and a second spacer 58 is disposed between the two bottom rails 51 by means of bolts 59. The bracket components 56 supporting the end rails are provided with a pair of space flanges 61 adapted to be disposed above and below the fixed side members 22. The lower flange 61 is provided with an adjustable screw 62 by which the bracket components 56 may be secured in position relative to the rigid frame 20.

It will be noted that the four end rails 51 are disposed in the spaces between the side rails 36 as best seen in FIGS. 3 and 4. In like manner, the side rails 36 are disposed in the spaces between the end rails 51 so that tne end frame assemblies 34 and side frame assemblies 32 may slide relative to each other during adjustment of the adjustable framework 30.

Referring now to FIG. 3, the four rails 36 of each of the side frame assemblies 32 are provided with elongated toothed racks 71, 72, 73 and 74, respectively, corresponding generally in length to the associated side rails 36. In like manner, the four end rails 51 of each of the end frame assemblies 34 are provided with elongated toothed racks 81, 82, 83 and 84, respectively, of the same type and tooth configuration as the racks 71 through 74. The racks 71 through 74 and 81 through 84 are positioned for sliding movement longitudinally of their associated side or end rails 36 and 51, respectively. The end rails 51 are disposed in a position inverted from the position of the side rails 36 as can be seen from a comparison of the crosssections of the rails in FIGS. 3 and 4. As a consequence, the racks 71, 72, 73 and 74 are disposed above and closely adjacent to the racks 81, 82, 83 and 84, respectively. Moreover, the racks 71 and 81 form a first rack layer, the gear racks 72 and 82 form a second gear rack layer, the gear racks 73 and 83 form a third gear rack layer and the gear racks 74 and 84 form a fourth or bottom layer of gear racks.

Figure 5:
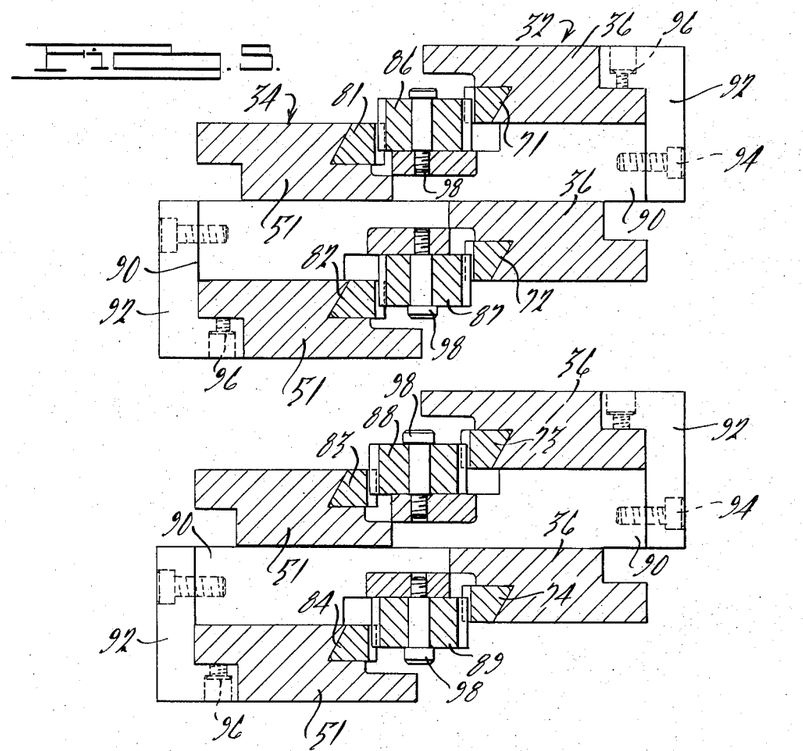
FIG. 5 is a sectional view taken on the lines 5—5 in FIG. 2.

The upper layer of gear racks made up of the racks 71 and 81 are disposed at right angles to each other to afford a generally rectilinear configuration. Moreover, as best seen in FIG. 5, the racks 71 and 81 are closely adjacent to each other and the teeth of the racks 71 and 81 are in common engagement with a gear 86 one of which is disposed at each of the four corners of the adjustable frame 30. Similarly, the racks 72 and 82 are joined together by four gears 87, the racks 73 and 83 are joined together by four gears 88 and the racks 74 and 84 are joined together by four gears 89.

Figure 6:
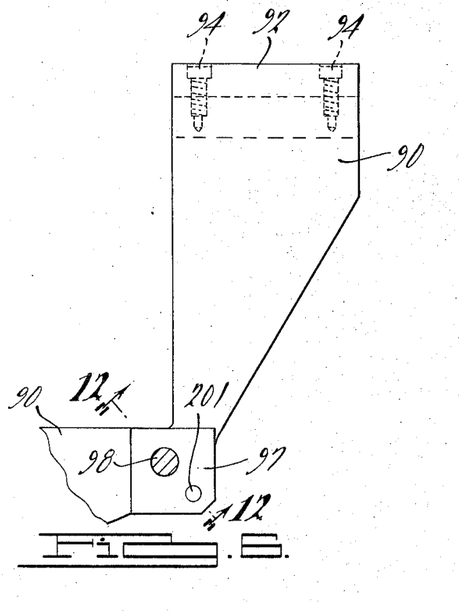
FIG. 6 is a plan view at an enlarged scale of elements of the clamping frame shown separate from the frame in FIG. 2 and with parts broken away.
Figure 12:
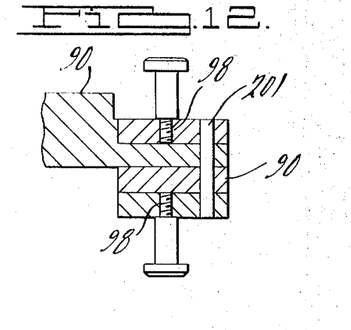
FIG. 12 is a sectional view taken generally on line 12—12 in FIG. 6.

Each gear, 88 through 89, of which there are a total of sixteen, is supported by a separate corner bracket 90. The corner brackets 90 are identical to each other and each has a generally wedge-shaped configuration as viewed in plan in FIGS. 2 and 6. The corner brackets 90 are of a thickness to be slidably inserted between the rails 36 and 51 as seen in FIG. 5. The outer end of each bracket 90 is provided with an L-shaped mounting cleat 92 having its longer leg secured to the end of the bracket member by means of bolts 94. The shorter leg of the L-shaped cleat 92 is provided with an adjustable set screw 96 by means of which the bracket 90 may be fixed relative to the adjustable side frame assemblies 32 and 34. The inner end of each corner bracket 90 is provided with a pedestal portion 97 which supports a vertically disposed axle 98 about which the gears 86 through 89 rotate. As shown in FIGS. 6 and 12, a locating pin 201 passes through aligned apertures of an adjacent pair of brackets 90 to insure axial alignment of the axles 98. The brackets 90 which support the gears 86 and 88 are supported by the side frame assemblies 32 and the brackets 90 which support the gears 87 and 89 are supported by the end frame assemblies 34. The position of the brackets 90 associated with the end rail assemblies 34 are reversed from the position of the brackets associated with the side rail assemblies 32 so that, in the latter, the vertical axles 98 for the gears 86 and 88 extend vertically upward and the axles 98 associated with the brackets 90 are supported by the end rail assemblies 34, extend vertically downward. All four of the axles 98 of the brackets 90 associated with a given corner of the adjustable frame assembly 30 are coaxial to each other and both of the pins 201 aligning the four brackets 90 at a given corner of the adjustable frame 30 also are axially aligned.

Movement of any one of the toothed racks in any given layer of racks of the adjustable framework 30 will result in movement of all of the remaining racks in that layer of racks. For example, as viewed in FIG. 2, movement of the upper toothed rack 71 to the right will result in movement of the toothed racks 81 and the other toothed racks 71 in a clockwise direction.

Figure 7:
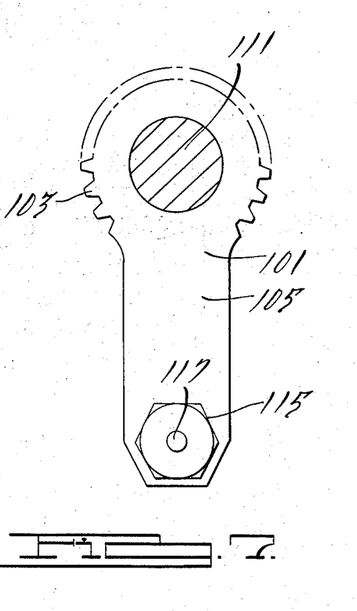
FIG. 7 is a plan view on an enlarged scale of one of the support elements shown in FIG. 2.

Referring now to FIG. 3, and particularly to the bottom rack 74, a support member 101 is shown having a toothed gear portion 103 with its teeth in engagement with the teeth of the rack 74. As seen also in FIG. 7, each support member 101 has a support arm 105 the outer end of which has a pedestal 107 threadably engaged with a threaded opening in the end of the support arm 105. The support pedestal 107 may be adjusted vertically to selected positions relative to the arm 105 by rotating the pedestal 107 to the desired position and locking it in the selected position by means of a nut 109. A plurality of support members 101 are disposed in spaced relationship and in engagement with each of the racks 74 in the lower layer of racks. Each of the support members 101 is mounted for pivotal movement about an axle 111 passing through a spacer element 113 and into threaded engagement with an opening in the lower side rail 36. The upper end of each pedestal 107 is provided with a head portion 115 which has a pointed projection 117 adapted to pierce the surface of the plastic material to insure gripping.

Referring now to FIG. 4 and particularly to the lower rack 84 in the lower layer of racks, a support member 121 is shown in engagement with the rack 84. The support member 121 is identical in most respects to the support members 101 except that the pedestal 123 is longer than the pedestals 107 associated with the support members 101 and the axles 111 for the gear portion 103 of the support member 121 extends vertically upward from the rail 51 whereas the axles 111 for the support members 101 extend vertically downward from the rails 36. A plurality of identical support members 121 are disposed in substantially equal spaced relation with each of the racks 84. A plurality of support members 101 and 121 of the type for engaging the lower sheet of plastic material 13 are similarly arranged in engagement with the racks 72 and 82, respectively, in the second layer of racks in position to engage the bottom surface of the upper sheet of plastic material 12.

Movement of the racks 74 and 84 in a counterclockwise direction, as viewed in FIG. 2, is effective through the gear portions 103 of the support members 101 and 121 to pivot the support members from the supporting position in which they are shown in FIG. 2 through an arc of approximately 90° to a retracted position in which the arms 105 lie generally parallel to the side rails 36. Similarly, movement of the racks 72 and 82 in the second layer of racks pivots the associated support members 101 and 121.

Referring now to FIGS. 2, 5 and 8, the corner gears 87 and 89 associated with the second and bottom layer of racks are each provided with a support arm 125 formed integrally with the gear. Each of the arms 125 is provided with a pedestal 127 similar to the pedestals 107 and 123 including the head portion 115 and projection 117. Upon movement of the racks 72 and 82 in the second layer of racks, and racks 74 and 84 in the bottom layer of racks, to retract the support members 101 and 121, the arms 125 associated with the corner gears 87 and 89 swing through an arc of approximately 45° from the supporting position shown in FIG. 2 to a retracted position.

The head portions 115 and projections 117 associated with the support members 101, 121 and 125 are adapted to engage the underside of the sheets of plastic material 12 and 13 to support them in a generally horizontal direction at substantially uniform spaced points around the periphery of the sheets.

Referring now to FIGS. 2 and 4, a plurality of holding members 131 are disposed to engage the upper surfaces of the sheets 12 and 13. As shown particularly in FIG. 4, the holding member 131 associated with the rack 81 has a toothed gear portion engaging the teeth of the rack 81 and a projecting arm 133, the outer end of which has an axle 135 rotatably supporting a roller 137 which is adapted to engage the top surface of the plastic sheet 12. Identical holding members 131 are associated with the racks 81 and 83 in the end rails 51.

Holding members 141 associated with the racks 71 and 73 in the side rails 36, as seen in FIG. 3, are similar to the holding members 131 except that the gear portion 143 is of a greater vertical height to provide the offset necessary between the side rails 36 and the top of the plastic sheets 12 and 13. The holding members 141 are provided with rollers 137 in the same manner as holding members 131.

The holding members 131 and 141 are supported to rotate about vertical axles 145 and 146, respectively. The axles 145 extend vertically upwardly from the side rails 51 and the axles 146 extend vertically downwardly from the side rails 36.

Each of the corner gears 86 and 88, seen in FIGS. 5 and 9, are provided with a holding arm 147 fixed to the gear and having the outer end provided with an axle 151 on which a roller 153 is rotatably supported. As in the case of the supporting members 121, movement of the racks 71 and 81 in the top layer of racks, and racks 73 and 83 in the third layer of racks, in a clockwise direction as viewed in FIG. 2, is effective to move the holding arms 131 and 141 from the retracted position shown through an arc of approximately 90° to a position in which the rollers 137 grip the tops of the plastic sheets 12 and 13. At the same time, the corner holding arms 147 and rollers 153 are pivoted from a retracted position through an arc of approximately 45° to a holding position in which the rollers 153 engage the upper surface of the plastic sheets 12 and 13.

It should be understood that the rollers 153 and 137 may be of the form shown or, if preferred, the gripping edges may be serrated or toothed to afford better holding action with the plastic sheet material.

In order to accommodate various sizes of plastic sheet material, the adjustable framework 30 made up of the side frame assemblies 34 may be adjusted relative to the rigid support frame 20. It will be apparent that to move any one of the side or end frame assemblies 32 or 34 it is necessary to disengage the large gears 86 through 89 associated with the corners of the adjustable frame 30. By way of example, if it is desired to move the end frame assembly 34 at the right in FIG. 2 relative to the side frame assemblies 32, the four gears 86 through 89 at the upper and lower corners of the frame must be disengaged from the teeth in the toothed racks 71 through 74 associated with both of the side frame assemblies 32. This is accomplished by loosening the vertically disposed set screws 96 in the brackets 90 supporting gears 87 and 89 from engagement with the end rails 51 which permits movement of the brackets 90 longitudinally of the end frames 51 and disengagement of the teeth of gears 87 and 89 from the racks 72 and 74 in the side frame assemblies 32.

To displace the gears 86 and 88, the bolts 94 in the brackets 90 engaging the side frame assemblies 32 are loosened so the arm of the bracket member 90 may be displaced inwardly of the frame relative to the cleat portion 92. Such displacement will move the gear axles and the gears 86 and 88 so that the teeth of the gears disengage from the toothed racks 71 and 73 associated with the side rails 36. In addition, the set screws 96 are moved out of engagement with the side rails 36 to permit displacement of the end frame assembly 34. The teeth of the corner gears may remain engaged with the end frame assembly 34 but after disengagement of the gear teeth from the toothed racks 71 through 74, the set screws 62 (FIG. 3) holding the end rail bracket component 56 in fixed position relative to the rigid frame 20 are loosened. The end frame assembly 34 is free to slide relative to the fixed frame 20 and relative to the side frame assemblies 32 to a selected position. After the selected position is obtained, the teeth of the gears 86 through 89 are moved back into engagement with the toothed racks 71 through 74. By tightening the various bolts 94 and the set screws 96 associated with the supporting bracket 90, the position of the corner gears 86 through 89 is reestablished. Tightening the set screws 62 in the end bracket reestablishes the position of the end frame assembly relative to the fixed frame 20.

Adjustment of the side frame assemblies 32 relative to the end frame assemblies 34 is accomplished in much the same manner as adjustment of the end frame assemblies by disengaging the gears 86 through 89 at opposite ends of the side frame assembly 32 from engagement with the racks 81 through 84 in the end frame assemblies 34.

Depending on the range of adjustment it may be necessary to remove or to add support members 101 and 121 or holding members 131 and 141 to the adjustable framework 30.

In operation, the entire clamping frame assembly 10 is disposed at the loading station 11 shown in FIG. 1. The loading station is provided with four linear actuators, 155 through 158, which are separate from the frame assembly 10 and which are operatively associated with each of the four layers of racks, respectively. In other words, the actuator 155 may be associated with one of the racks 81 in the top layer of racks, the actuator 156 may be associated with a rack 82 in the second layer of racks, the actuator 157 may be associated with a rack 83 in the third layer of racks and the actuator 158 may be connected to a rack 84 in the lower most layer of racks. The actuators 155 through 158 may be either electrically operated or air or hydraulically actuated and may be mounted in fixed position at the loading station. Operation of such actuators is well known in the art and a detailed description is not necessary to a full understanding of the invention. It is simply necessary for the actuators to engage a rack and to move a predetermined distance to move one rack in any given layer of racks so that all of the associated support members 101, 121 and 125 and the holding members 131, 141 and 147 are moved by the racks from their retracted position to a plastic sheet engaging position. By way of example, in FIG. 3, a link 159 of one of the actuators is shown in abutting engagement with the end of the rack 82. Thereafter, the actuators 155 through 158 may be actuated in the opposite direction, out of engagement with the racks and to their original position. The clamping frame assembly 10 may then be moved from the loading station to its heating station leaving the actuators 155 through 158 in position at the loading station.

At the loading station, the clamping frame 10 may be considered as having all of its support arms 101, 121 and 125 and all of its holding arms 131, 141 and 147 in their retracted position so that the clamping frame assembly 10 offers a fully open frame. This can be visualized best from FIG. 2 in which the edge of the sheets 12 and 13 is shown in broken line. The holding arms 131, 141 and 147 are shown retracted and the supporting arms 101, 121 and 125 are shown in their supporting positions. With all of the supporting arms retracted to positions similar to the retracted positions of the holding arms, the edge of the sheets 12 and 13 are spaced inwardly from the frame mechanisms and the clamping frame 10 can be considered as completely open.

As previously pointed out, the clamping frame assembly 10 permits loading of plastic sheet material from either the top or the bottom. However, for the purposes of description, it will be assumed that two sheets of plastic material, 12 and 13, are to be loaded from the top of the frame 10.

To begin the loading operation, the actuator 158 is operated to move the racks 74 and 84 in the lower layer of racks in a direction to swing the various support arms 101, 121 and 125 associated with the lower layer of racks from their retracted position to a position projecting inwardly into the open portion of the frame 10 as seen in FIG. 2. A sheet of plastic material 13 may then be placed within the frame with the perimeter of the sheet in engagement with the head portions 115 and projections 117 forming parts of the various pedestal supports 107, 123 and 127 associated with the lower most layer of racks. Thereafter, the actuator 157 associated with the third layer of racks is operated to cause the holding arms 131, 141 and 147 to swing from their retracted position shown in FIG. 2 to their holding position in which the rollers 137 and 153 engage the top surface of the lower plastic sheet 13 vertically above the point at which the various pedestal supports engage the bottom surface of the sheet 13. The actuator 156 associated with the second layer of racks may be operated simultaneously with the actuator 157 associated with the third layer of racks so that the holding members 131, 141 and 147 for the bottom sheet of plastic material 12 move into position simultaneously. Thereafter, the second sheet of plastic material 12 may be placed in position to rest on the head portions 115 and projections 117 of the pedestals 107, 123 and 127 associated with the second layer of racks. Finally, the actuator 155 associated with the top layer of racks is actuated to swing the holding arms 131, 141 and 147 from their retracted to their holding position. The frame is now loaded with the plastic sheets 12 and 13 in parallel spaced relation to each other. Upon retraction of the actuators 155 through 158, the entire frame assembly 10 and plastic sheets 12 and 13 is ready to be conveyed from the loading station 11 to the heating zone 14.

In the heating zone, the two plastic sheets 12 and 13 are heated to a desired, heat formable temperature by any one of a number of methods well known in the art.

The heated sheets of plastic material may be transported from the heating station 14 to the molding station 16 in which they may be formed by means of vacuum forming, inflation forming or a combination of both methods all of which are well known in the art. Upon completion of the molding process the entire clamping frame assembly 10 with the molded product is moved to an unloading station 18. The unloading station 18 (FIG. 1) is provided with a plurality of actuators 161 through 164, one of which becomes associated with each of the four layers of racks, respectively, upon positioning of the clamping frame 10 in the loading station.

Unloading of the molded product from the clamping frame assembly 10 may be accomplished either through the top or through the bottom of the clamping frame assembly 10. Assuming that bottom unloading is preferred, which might be the case with large, heavy molded forms, all four of the actuators 161 through 164 may be actuated simultaneously to swing the holding arms 131 and 151 to their retracted position. This will free the molded form from the clamping frame assembly 10 so that the molded product may be moved downwardly relative to the entire frame assembly.

If it is desired to remove the molded object through the top of the clamping frame assembly 10, the actuators 161, 162 and 163 associated with the upper three layers of racks may be actuated simultaneously leaving the support arms 101, 121 and 125 associated with the lower layer of racks in engagement with the molded form. Thereafter, the molded product may be removed from the top of the frame assembly 10 leaving the support arms 101 and 121 in position to receive a sheet of plastic material 13 when the clamping frame assembly 10 is returned to the loading station 11.

Figure 10:
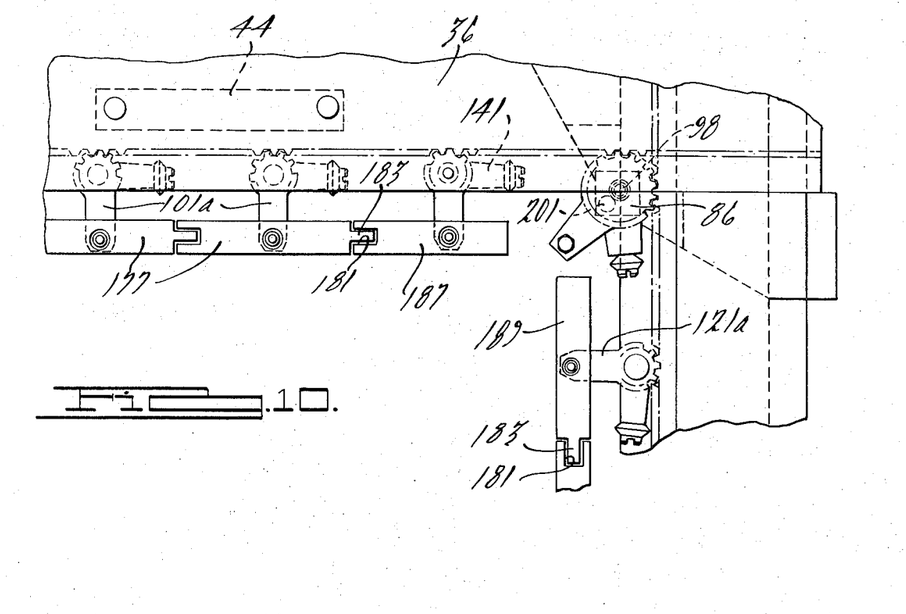
FIG. 10 is a fragmentary view similar to FIG. 2 but of another embodiment of the invention.
Figure 11:
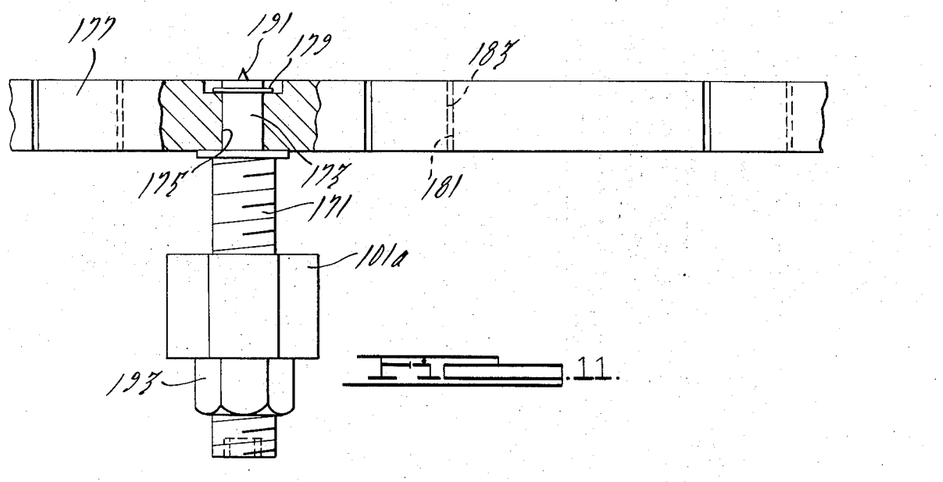
FIG. 11 is a view taken generally on line 11—11 in FIG. 10.

Referring now to FIGS. 10 and 11 showing a modification of the invention, a plurality of support arms 101a and 121a are similarly disposed as the support arms 101 and 121. The outer ends of the support arms 101a and 121a are each provided with a pedestal 171 threadably engaged with an opening in the outer end of the arms 101a and 121a. The upper end of each of the pedestal elements 171 has a reduced end portion 173 passing through an opening 175 in its associated rest bar 177. Each rest bar 177 is secured to the reduced end portion 173 of one of the pedestals 171 by means of a circular clip 179. Opposite ends of each of the rest bars 177 are provided with a groove 181 and a tongue 183. The groove 181 of any one of the rest bars 177 is adapted to receive the tongue 183 of the adjoining rest bar.

All of the support arms 101a and 121a except those adjacent the corners of the adjustable frame 30 are provided with identical rest bars 177. The support arms 101a and 121a adjacent the corners of the adjustable frame 30 are provided with shorter rest bars. As seen in FIG. 10, the arms 101a adjacent the corner of the frame 30 is provided with a rest bar 187 which is somewhat shorter than the rest bars 177 and has only a groove portion 181. The adjoining rest bar 189 associated with the support arm 121a is shorter than the rest bars 177 and is lacking a groove portion 181. The rest bars 187 and 189 are formed in this manner to afford clearance with the support members 125 associated with the corners of the adjustable frame 30.

Upon movement of the racks 72 and 82 in the second layer of racks and the racks 74 and 84 in the bottom layer of racks from a sheet supporting position shown in FIG. 10 to a retracted position, all of the rest bars 177, 187 and 189 move in unison. The rest bars have been found desirable with certain sizes and types of plastic sheet material to afford substantially complete support at the bottom perimeter of the plastic sheets 12 and 13 to avoid sagging of the plastic sheets when they are heated in the heating zone 14.

Each of the pedestals 171 is provided with a projection 191 identical to the projections 117 for more positively engaging the bottom surface of the sheets 12 and 13 to prevent slippage. In addition, the pedestals 171 may be adjusted vertically by way of the threaded engagement with the arms 101a and 121a to a selected position to accommodate any deflection or warpage in the adjustable frame 30. The selected position is insured by means of a lock nut 193.

It should be noted that the use of support arms with rest bars 177, 187 and 189 does not change the mode of operation of the thermoforming clamping frame. Moreover, the adjustment of frame size is made in much the same manner as with the embodiment of the invention shown in FIGS. 1 through 9 except that removal or addition of support arms 101 and 121 due to frame size requires the location of rest bars 187 and 189 adjacent the four corners of the frame.

Figure 13:
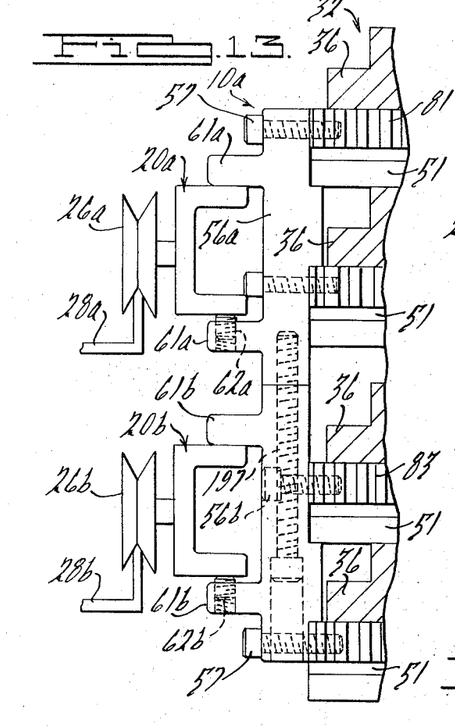
FIG. 13 is a view similar to FIG. 3 but showing another embodiment of the invention.
Figure 14:
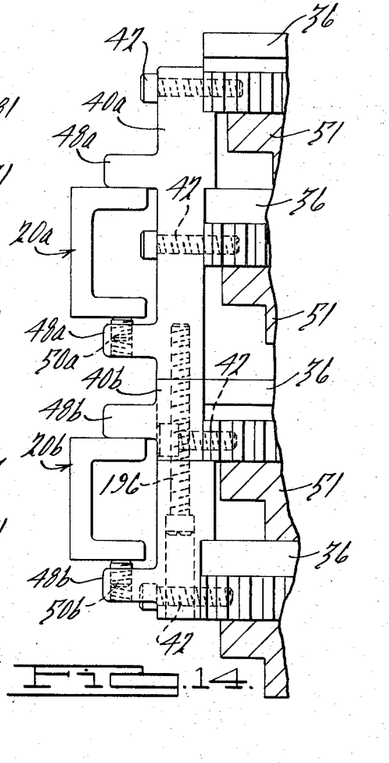
FIG. 14 is a view similar to FIG. 4 and showing the embodiment of the invention in FIG. 13.

Referring now to FIGS. 13 and 14, still another embodiment of the invention is shown which makes it possible to move the upper sheet holding portion of the frame assembly and the lower sheet holding portion of the frame assembly relative to each other. In this embodiment of the invention, a clamping frame assembly 10a is made up of a pair of rigid supporting frames 20a and 20b similar in form and construction to the rigid frame 20 in the embodiment of the invention shown in FIG. 2. The frame 20a supports the upper sheet holding structure and the frame 20b supports the lower sheet supporting structure.

A bracket component 56a is connected to the ends of the upper two end rail members 51 by means of bolts 57. In a similar manner, the bracket component 56b is connected to the lower two end rails 51 by means of bolts 57. Each of the bracket components 56a is provided with a pair of spaced flanges 61a which are adapted to be disposed above and below the fixed frame 20a. The lower flange 61a is provided with an adjustable screw 62a by which the bracket component 56a may be secured in a fixed position relative to the rigid frame 20a. Each of the lower bracket components 56b also has a pair of flanges 61b disposed above and below the rigid frame 20b and a screw 62b by which the bracket components 56b may be hold in position relative to the frame 20b. The upper frame 20a is provided with wheels 26a adapted to engage conveyor track 28a and in a similar manner the lower rigid frame 20b is provided with wheels 26b adapted to engage a separate conveyor track 28b. A pair of parallel spaced tracks 28a and another pair of tracks 28b may be located in much the same manner as the tracks 28 shown in FIG. 1 so that the mechanism associated with the rigid frame 20a and 20b may be moved from station to station during the thermoforming operation.

Referring to FIG. 14, a bracket component 40a is connected to the ends of the upper two side rail members 36 and a bracket component 40b is connected to the lower two side rails 36, all by means of bolts 42. Bracket component 40a has a pair of spaced flanges 48a disposed above and below the fixed frame 20a and is held in fixed relation thereto by an adjustable screw 50a. In like manner, bracket component 40b has a pair of spaced flanges 48b disposed above and below the fixed frame 20b and located relative thereto in fixed relationship by means of a screw 50b.

The bracket components 40a and 40b may be held together by a bolt 196 as shown in FIG. 14 and bracket components 56a and 56b may be held together by bolts 197 as shown in FIG. 13. The bolts 196 and 197 are used only when it is desired to use the upper and lower sheet holding structures as a unit.

Figure 15:
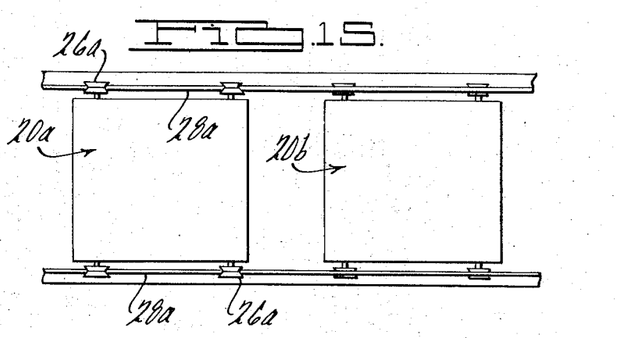
FIG. 15 is a schematic plan view illustrating an operation which can be performed with the embodiment of the invention shown in FIGS. 13 and 14.
Figure 16:
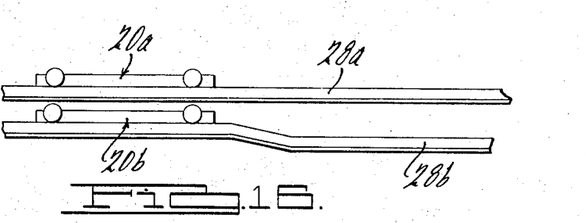
FIG. 16 is a schematic elevational view of the embodiment shown in FIGS. 13 and 14.

The modification of the invention shown in FIGS. 13 and 14 makes it possible to use the frame assemblies 20a and 20b independently of each other but, more importantly, the separate frame assemblies 20a and 20b afford greater flexibility to the thermoforming operation. By way of example, when thick sheets of plastic material are to be formed simultaneously it is sometimes difficult to obtain uniform heating of the sheets of plastic material. Use of the separate frame assemblies 20a and 20b makes it possible to move the assemblies 20a and 20b separately into separate heating zones to obtain a thorough heating of each of the thick plastic sheets and thereafter, the frames 20a and 20b may be moved into proper alignment with the sheet 12 above and parallel to the sheet 13 for forming of the plastic product. As seen in FIG. 15, this may be accomplished by displacing frame 20a horizontally relative to frame 20b. Also, by vertically spacing the rails 28a and 28b as shown in FIG. 16, the vertical spacing of the plastic sheets 12 and 13 may be varied.

The horizontal or vertical displacement of the frame assemblies 20a and 20b offer a number of possibilites particularly desirable in the formation of certain products not only in the loading and unloading stations but also in the heating zone. It should be noted that the use of a pair of frames 20a and 20b instead of a single frame 20 does not change the manner of operation of the thermoforming clamping frame mechanism and that adjustment of the frame size can be made in much the same manner as with the embodiment of the invention shown in FIGS. 1 through 9.

The complete retraction of the holding arm members and supporting arm members is an important aspect of the invention since, in the retracted position of the various arms, a completely open frame is afforded which permits the easy removal of a molded product. Heretofore, frames conventionally used have one or more fixed supporting layers and since the plastic sheet material usually remains attached to the molded product in the form of flash which is later removed, the flash must be sprung or deflected so that clearance is afforded between the flash on the product and the frame to permit removal. This is not only costly in terms of labor or equipment but may have detrimental effect on the molded product because the flexing or springing of the flash material imposes loads on the molded portion which may be undesirable.

After the molded product is removed from the frame, the entire assembly may be returned to a loading station where two sheets of plastic material may be loaded in the frame 10. It should be understood that an important advantage of the present frame is that both sheets of material 12 and 13 may be loaded from either the top of the frame or the bottom of the frame whereas prior constructions require loading one sheet from the top and one sheet from the bottom or they may require loading the bottom sheet through an intermediate portion of the frame and the top sheet through the top of the frame.

Another important aspect of the invention is that the rails 36 in the side frame assemblies 32 and the rails 51 in the end frame assemblies 34 have the same cross-section which makes it possible to extrude or form the rail material economically rather than manufacture by usual machining processes. This is significant since there are a total of 16 side and end frame members. In like manner, the toothed racks 71 through 74 and 81 through 84 are identical in form as are the supporting brackets 90.

Other important aspects of the invention are that the frame may be adjusted to accommodate various sizes of sheet material to be processed without reconstructing the frame. Also, the actuators for moving the various support members and the holding members may be left at the loading and unloading stations and need not be transported into the heating zone where the heat has detrimental effect on the actuators and also obviating the necessity for air or hydraulic lines to be movable with the frame.

The repetitive heating and cooling to which the clamping frame assemblies are subjected frequently results in warpage, as a result of which prior clamping frames have been ineffective to completely grip the entire perimeter of a sheet of plastic material. In the clamping frame assembly 10 embodying the present invention, however, adjustment of the various pedestal 107, 123, 127 and 171 make it possible to make adjustments to compensate for any warpage of the frame members so that the plastic sheet material is uniformly and effectively held in position during heating and molding.

It will be seen that there has been provided a thermoforming clamping frame which is adapted to hold two sheets of plastic material in parallel spaced planes and that the frame may be completely open to permit either unloading of the molded product through the bottom or through the top of the frame and, in like manner, a number of possibilities are afforded for loading of the uniformed plastic sheet material into the frame. It also will be apparent that although the frame has been disclosed for the purpose of holding a pair of parallel spaced sheets of plastic material, that in some processes and methods of thermoforming plastic sheets, a single sheet may be desired in which case only the upper two layers or the bottom two layers of the frame assemblies would be utilized. Alternatively, the unused two layers may be completely removed from the frame.

It is to be understood that several modifications may be made to the disclosed structure without departing from the scope of the appended claims and that many minor details of the structure have not been disclosed for the purpose of clarity.

What is claimed is:

1. Apparatus for supporting plastic sheet material during thermoforming thereof, comprising; a framework shaped to surround a sheet of plastic material, support means mounted on said framework for movement from a retracted position outwardly spaced from the peripheral edges of said sheet of plastic material to a position adapted to engage and support one surface of a sheet of plastic material, holding means mounted on said framework for movement from a retracted position outwardly spaced from the peripheral edges of said sheet of plastic material to a position adapted to engage and hold the opposite surface of said sheet of plastic material, said support and holding means being movable independently of each other from one position to the other, means to simultaneously actuate said support means to sheet engaging and retracted positions, and means to simultaneously actuate said holding means to sheet engaging and retracted positions.

2. The apparatus set forth in claim 1 in which said framework includes pairs of parallel spaced side and end members, each of said members being adjustable to selected positions toward and away from the edge of said plastic sheet material for different lengths and widths of plastic sheets and in a plane generally parallel thereto independently of the other of said members, and in which said support and holding means are mounted on said members.

3. The apparatus set forth in claim 2 in which said support means include a plurality of support arms substantially uniformly spaced longitudinally of each of said members and in which said holding means include a plurality of holding arms substantially uniformly spaced longitudinally of each of said members.

4. The apparatus set forth in claim 3 and further comprising first connecting means associated with each of said members and connecting said support arms associated with each of said members to each other for simultaneous movement in response to movement of at least one of said support arms, and second connecting means associated with each of said members and connecting said holding arms associated with each of said members to each other for simultaneous movement in response to movement of at least one of said holding arms, and first additional means connecting said first connecting means to each other for simultaneous movement of all of said support arms and second additional means connecting said second connecting means to each other for simultaneous movement of all of said holding arms.

5. The combination set forth in claim 4 in which the first and second connecting means are each toothed racks and in which the additional means connecting said first connecting means together and said second connecting means together are toothed gears in simultaneous engagement with a pair of said racks.

6. The combination set forth in claim 1 wherein said support means include a plurality of support arms substantially uniformly spaced apart around the perimeter of said framework and wherein said holding means include a plurality of holding arms substantially uniformly spaced around said framework, said support and holding arms being disposed for pivotal movement from said retracted positions to said positions engaging opposed surfaces of said plastic sheet material.

7. The combination set forth in claim 6 wherein said means to simultaneously actuate said support means and said holding means includes first connecting means connecting said support arms to each other for simultaneous pivotal movement of all of said support arms in response to pivotal movement of one of said support arms, and second connecting means connecting said holding arms to each other for simultaneous pivotal movement of all of said holding arms in response to pivotal movement of at least one of said holding arms.

8. The apparatus set forth in claim 7 and further comprising actuator means for moving at least one of said support arms and at least one of said holding arms.

9. The combination set forth in claim 7 in which said first and second connecting means are in the form of toothed racks and in which each of said arms are provided with toothed gear portions, in engagement with the teeth of said racks.

10. The combination set forth in claim 9 and further including first toothed gear means interconnecting said toothed racks associated with said support arms for simultaneous movement of said support arms in response to movement of one of said toothed racks, and second toothed gear means interconnecting said toothed racks associated with said holding arms for simultaneous movement of said holding arms in response to movement of one of said toothed racks.

11. The combination set forth in claim 10 and further comprising additional support arms formed integrally with said first toothed gear means, additional holding arms formed integrally with said second toothed gear means, and wherein movement of one of said racks associated with said support arms and movement of one of said racks associated with said holding arms is operative to move said arms through an arc of substantially 90° and said additional arms through an arc of 45° from a retracted position to a sheet engaging position.

12. The apparatus set forth in claim 7 and further comprising actuator means supported separately from said framework and operatively connected to each of said connecting means.

13. The apparatus set forth in claim 6 in which each of said support arms is disposed opposite a holding arm in opposed positions at opposite sides of said plastic sheet material when said arms are in engagement with the latter.

14. The combination set forth in claim 6 in which said arms are each mounted for pivotal movement about axes perpendicular to the plane of said sheet of plastic material.

15. The apparatus set forth in claim 6 and further comprising a roller mounted on each of said holding arms for rotation about an axis parallel to the plane of said sheet of plastic material and adapted to engage the latter.

16. Apparatus for supporting a pair of sheets of plastic material in parallel spaced relation to each other comprising: a frame means shaped to surround said sheets of plastic material, said frame means including pairs of parallel spaced side and end members, separate sets of support means mounted on said side and end members for movement between a retracted position outwardly spaced from the peripheral edges of said sheets of plastic material and a position adapted to engage and support one side of each sheet of plastic material, separate sets of holding means mounted on said side and end members for movement between a retracted position outwardly spaced from the peripheral edges of said sheets of plastic material and a position adapted to engage and hold the other side of each sheet of plastic material, said separate sets of support and holding means being movable independently of each other between said positions, and means to move said separate sets of support means and said holding means between sheet engaging and retracted positions.

17. The combination set forth in claim 16, each of said members being adjustable to selected positions toward and away from said plastic sheet material and in a plane parallel thereto independently of the other members.

18. The combination set forth in claim 16 wherein pairs of support means are associated with said pairs of sheets of plastic material, respectively, and wherein pairs of holding means are associated with said pairs of sheets of plastic material, respectively.

19. The combination set forth in claim 18 wherein each of said support means includes a plurality of support arms substantially uniformly spaced apart longitudinally of each of said members and wherein each of said holding means include a plurality of holding arms substantially uniformly spaced longitudinally of each of said members, said support arms and holding arms being disposed for pivotal movement from a retracted position to positions engaging opposed surfaces of said sheets of plastic material.

20. The combination set forth in claim 19 and further comprising connecting means connecting said support arms associated with a given sheet of plastic material to each other for simultaneous pivotal movement and connecting means connecting the holding arms associated with a given sheet of plastic material to each other for simultaneous pivotal movement.

21. The combination set forth in claim 19 and further comprising actuator means supported separately from said framework and operatively engaged with each of said connecting means.

22. Apparatus for supporting a pair of sheets of plastic material comprising, first frame means shaped to surround and adapted to be associated with one sheet of said pair of sheets of plastic material, second frame means shaped to surround and adapted to be associated with the other sheet of plastic material, first support means mounted on said first frame means for movement between a retracted position outwardly spaced from the peripheral edges of said one sheet of plastic material and a position adapted to engage and support one side of said one sheet of plastic material, holding means mounted on said first frame means for movement between a retracted position outwardly spaced from the peripheral edges of said one sheet of plastic material and a position adapted to engage and hold the other side of said one sheet of plastic material, second support means mounted on said second frame means for movement between a retracted position outwardly spaced from the peripheral edges of said other sheet of plastic material and a position adapted to engage and support one side of said other sheet of plastic material, and holding means mounted on said second frame means for movement between a retracted position outwardly spaced from the peripheral edges of said other sheet of plastic material and a position adapted to engage and hold the other side of said other sheet of plastic material, separate conveyor means operatively associated with each of said first and second frame means and supporting said frame means for movement in parallel spaced relationship to each other, and means detachably connecting said first and second frame means to each other for movement in unison and being detachable to permit movement on said separate conveyor means independently of each other.

23. The combination set forth in claim 22 in which said separate conveyor means are disposed to permit displacement of said first and second frame means in planes parallel to each other and varying in vertical spacing from each other.

* * * * *